United States Patent

[11] 3,585,337

[72] Inventor Wallace C. Rudd
       Larchmont, N.Y.
[21] Appl. No. 827,530
[22] Filed May 26, 1969
[45] Patented June 15, 1971
[73] Assignee AMF Incorporated

[54] FORGE WELDING BY HI-FREQUENCY HEATING AND METAL DEPOSITION
9 Claims, 7 Drawing Figs.

[52] U.S. Cl. ............................................. 219/67,
       219/59, 219/64, 219/101, 219/104
[51] Int. Cl. ........................................... B23k 31/06
[50] Field of Search ............................................ 219/59, 62,
       64, 67, 101—107, 8.5, 117; 29/477.7, 503

[56] References Cited
UNITED STATES PATENTS
2,818,488 12/1957 Rudd et al. .................. 219/67
2,931,885 4/1960 Underwood et al. .......... 219/67
3,028,469 4/1962 Bognar ......................... 219/8.5
3,288,982 11/1966 Suzuki et al. ................. 219/137
3,385,948 5/1968 Redmond ..................... 219/102

Primary Examiner—J. V. Truhe
Assistant Examiner—L. A. Schutzman
Attorneys—George W. Price and Eli Weiss ABSTRACT: Metal workpieces that are to be joined by welding are brought to or near forge welding temperature by a first heating means such as a high frequency resistance heating means or a high frequency induction heating means. At the same time that the workpieces are being heated to their desired temperature by the first heating means or at a short interval of time thereafter, a stream of hot molten metal droplets from a metallizing type of gun means is directed to and impinges upon the metal workpieces and amount of molten metal of the workpieces in the weld area.

INVENTOR
WALLACE C. RUDD
BY
*Eli Weiss*
ATTORNEY

INVENTOR
WALLACE C. RUDD
BY
*Eli Weiss*
ATTORNEY

FORGE WELDING BY HI-FREQUENCY HEATING AND METAL DEPOSITION

This invention relates generally to methods and apparatus adapted for joining by welding two metal workpieces and more particularly to the forge welding of longitudinal seams in a shaped metal strip to form a metal tube, where droplets of molten metal such as is obtained from a metallizing gun are directed to fall upon the weld area to increase the amount of molten metal in the weld area subsequent to the weld area having been initially heated to a desired temperature.

In one method of joining by welding two metal workpieces, the edges of the workpieces can be brought to forge welding temperature by high frequency resistance heating means or by high frequency induction heating means.

When forming a tube, normally a strip of metal is shaped by forming rolls to urge the edges of the strip to converge to a weld point where they are forced together, generally by pressure rolls. The converging edges of the strip can be heated to welding temperature by an induction coil located around the tube a short distance in advance of the weld point, or by sliding contacts as disclosed in U.S. Pat. No. 2,818,488 entitled Tube Welding by W. C. Rudd et al. which heats the converging edges by high frequency resistance heating.

However, certain types of steels contain lines of segregation or planes of weakness. When the edges of such steels are forced together as occurs when making tubes or structural members, particularly when the steel has a dimension of approximately three-sixteenths of an inch or above, the forcing together of the edges during the forging action causes the segregated lines to be bent outward and at right angles to their original plane.

The scarfing or cutting off of the weld upset from the bottom and top surfaces of the weld exposes the ends of the bent lines of segregation or planes of weakness and surface cracks called hook cracks sometimes result.

By using, in combination, a first heating means such as a high frequency resistance heating means or a high frequency induction heating means to initially heat the weld area to a desired temperature together with a metallizing gun arranged to feed a stream of molten droplets of metal to the initially heated weld area to increase the amount of molten metal in the weld area, less forging pressure is required to form a weld.

It is an object of this invention to use a metallizing gun to bring the edges of workpieces which are to be welded together to a condition more suitable for forge welding.

It is an additional object of this invention to increase the amount of molten metal in the weld zone of workpieces which are being welded together.

It is another object of this invention to add metal to the weld zone of workpieces which are being welded together.

It is still another object of this invention to add molten metal to the weld zone of workpieces which are being welded together where the metal added comes from a metallizing gun and is similar to that of one or both of the workpieces.

It is still another object of this invention to add molten metal to the weld zone of workpieces which are being welded together where the metal added comes from a metallizing gun and is not similar to that of one or both of the workpieces.

It is still another object of this invention to add molten metal to the weld zone of workpieces which are being welded together to provide a weld having improved characteristics.

It is another object of this invention to provide an improved weld of two workpieces brought to a final plastic state by a stream of hot molten metal droplets from a metallizing gun.

It is still another object of this invention to increase the rate of welding of two workpieces brought to a final plastic state by a stream of hot molten metal droplets from a metallizing gun.

It is yet another object of this invention to provide sufficient liquid metal so that oxides, inclusions, and extraneous material can be squeezed out to provide an improved weld of two workpieces brought to welding conditions by a stream of hot molten metal droplets from a metallizing gun. Other objects and many of the attendant advantages of this invention will be readily appreciated as the same become better understood by reference to the following detailed description when considered in connection with the accompanying drawings wherein.

Figure 6:
Figure 7:

FIG. 6 is a view of a weld seam in section illustrating the flow lines of metals brought to final heat with high frequency heating means and joined by forging; and FIG. 7 is a view in section of a weld seam illustrating the improved flow lines of metals brought to a final melt condition in accordance with the principles of this invention. In this invention, metal workpieces that are to be joined by welding are brought to a desired forge welding temperature by a first heating means such as high frequency resistance heating means, or high frequency induction heating means. At the same time that the workpieces are being heated to their desired temperature by the heating means or at a short interval of time thereafter, a stream of hot molten metal droplets from a metallizing gun is directed to and impinges upon the metal workpieces to provide more plastic or fluid metal at the weld seam. In those instances where the rate of heat supplied to the workpieces by the stream of hot molten metal droplets from a metallizing gun is greater than the rate of heat dissipation of the workpiece, then the temperature of the workpieces may be increased slightly by the stream of hot molten metal droplets from the metallizing gun.

The rate of welding is high for relatively thick materials, approximately three-sixteenths of an inch or above, as the real heat contribution is obtained from the high powered high frequency source; and the stream of hot molten metal droplets from the metallizing gun which is directed to impinge upon the surfaces to be joined at or just prior to the weld point provides additional melted or plastic metal than would normally be present across the interface by the use of the high frequency heating source separately.

The high frequency heating means contributes the heat to the metals to be welded. However, it does not produce an optimum uniformity of interface temperature and, as a result, heavy forging action is required to make a weld. The use of a metallizing gun type of means in combination with a high frequency heating means produces additional melted or plastic metal at the weld area, and substantially less forging pressure is required to make a weld. It is only by decreasing the forging pressure that the bending outward of the planes of weakness can be avoided and the tendency to produce hook cracks is reduced.

Thus, the stream of hot molten metal droplets from a metallizing gun produces a final molten face on the heated edges that are to be welded either where they come together or just upstream of the weld point. The molten metal together with surface impurities is squeezed out by the squeeze or forge rolls, substantially less pressure being required to form the weld than if the high frequency heating means were used without the stream of hot molten metal droplets from a metallizing type of gun.

Figure 1:
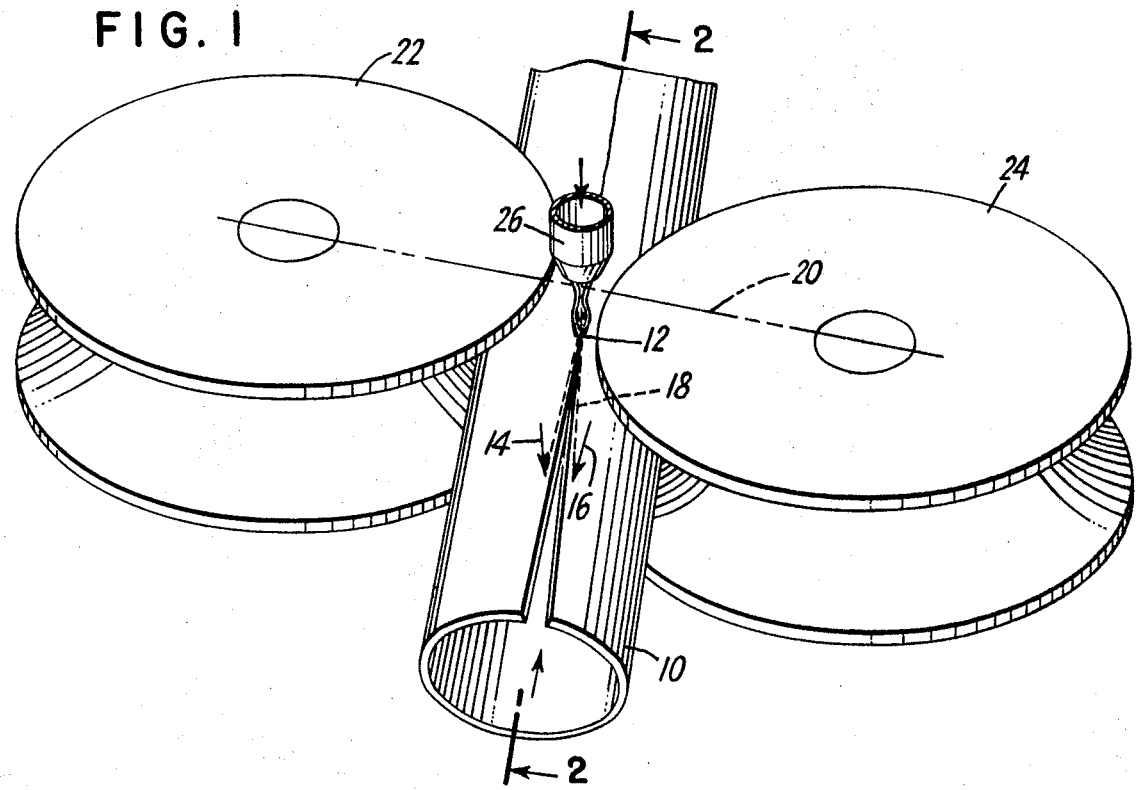
FIG. 1 is a view, in perspective, of structure in accordance with the principles of this invention.

Referring to FIG. 1 there is illustrated structure in accordance with the principles of this invention. A length of flat strip stock 10 is advanced through shaping rolls, the edges of the strip being positioned to come together to form a tube. The edges are welded together at a point 12.

Before reaching the weld point 12, the edges of the strip can be heated to a desired temperature by an induction coil positioned around the tube, or by the use of high frequency resistance heating means utilizing two sliding contacts as disclosed in U.S. Pat. No. 2,818,488 entitled Tube Welding by W. C. Rudd et al.

In those instances where high frequency resistance heating is utilized, contacts 14, 16 for the high frequency current are applied to the edges of the strip being shaped upstream from the weld point 12, and the high frequency current flows from one contact 14 along one edge of the strip to the weld point 12, then back along the other edge of the strip to the other contact 16 as illustrated by the dotted line 18. The current flowing through the edges of the strip 10 heats the edges of the strip to forge welding temperature. Actually, heating from the high frequency current ceases a small distance upstream from the intersection of the line 20 which extends through the centers of the squeeze rolls 22 and 24 with the weld seam being formed in the tube.

In those instances where high frequency resistance heating is utilized, the structure as disclosed in FIGS. 1 and 3 through 5 of U.S. Pat. No. 2,818,488 can be used, it being understood that the figures and description of U.S. Pat. No. 2,818,488 is made a part of this description the same as if it had been actually incorporated herein.

A stream of hot molten metal droplets from a metallizing gun-type of means 26 is positioned to impinge upon the heated edges of the strip 10 at or slightly upstream from the point 12. The additional molten or plastic metal applied to the facing metal edges of the tube by the stream from the metallizing gun-type of means helps to improve the temperature distribution of the hot edges at the point 12 in addition to providing and adding additional melted or plastic metal for producing the improved type of weld.

Figure 2:
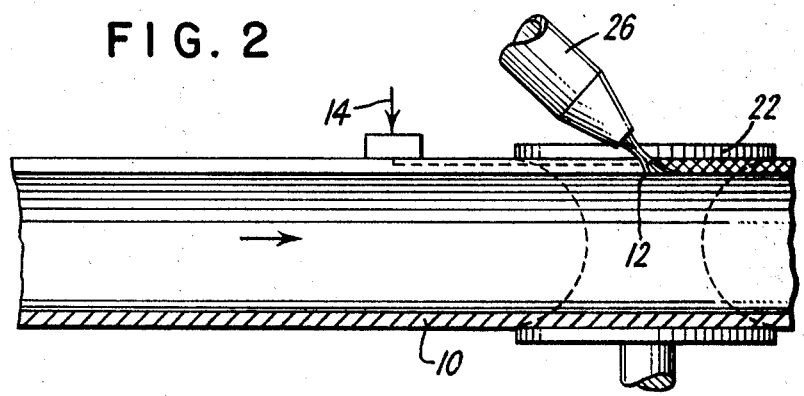
FIG. 2 is a view along the line 2-2 of FIG. 1.

Referring now to FIG. 2, there is illustrated a view along the line 2-2 of FIG. 1 showing the contact 14 riding on the top surface of the strip 10, a squeeze roll, and the metallizing gun type of means 26 positioned to direct a stream of hot molten metal droplets to impinge upon the edges to be welded at the weld point 12. It is to be noted that while the stream of hot molten metal droplets follows a path that is at an angle with the weld seam being formed, in some instances it may be desirable to have the stream of hot molten metal droplets follow a path that is perpendicular or at right angles to the seam being formed and the longitudinal axis of the tube.

Figure 3:
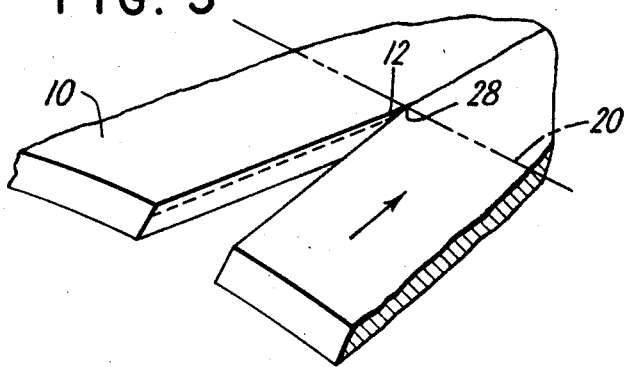
FIG. 3 is a view at the weld area, the metal forming rolls and metal heating means having been removed for purposes of clarity.

FIG. 3 is a view of the metal strip 10 at the weld area, the metal forming rolls and metal heating means having been removed for purposes of clarity. At the apex of the V, the edges of the strips are brought together. It is at this junction that the high frequency heating current crosses from one edge to the other edge. It is also at this junction that forging action normally occurs to create the upset that causes the undesired hook cracks. The area identified by reference numeral 28 which can surround the weld point 12 defines the target area for the hot stream of molten metal droplets; the target area including the apex of the V from the top surface of the strip 10 through to the bottom surface of the strip 10.

Figure 4:
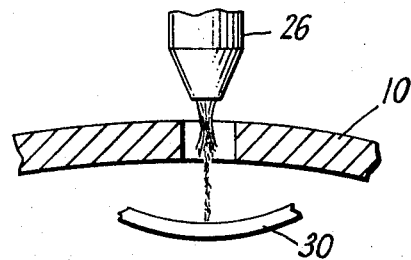
FIG. 4 is a view looking into the weld area from a point upstream from the weld area.

FIG. 4 is a view looking into the weld area upstream from the weld point 12. It is to be noted that while the contacts are not shown, when high frequency resistance heating is used the heating current flows along the sides of the two edges and the stream of hot molten metal droplets impinges on the sides of the two edges. In some instances a small portion of the stream of hot molten metal droplets may pass through the V gap, and, in those instances where a tube is being formed, will pass through and deposit metal on the opposite wall of the tube. If the adding of metal to the opposite wall of the tube is not desired by the stream of hot molten metal droplets, a shield 30, which can be water-cooled, can be positioned within the tube to interrupt the stream of hot molten metal droplets. If desired, the shield 30 can have a concave shape to act as a channel for water, the water being either contained as in a trough or running. When the water is contained, the small droplets of solidified metal will collect within the trough and, in time, will have to be emptied. In those instances where the water is running, the small droplets of solidified metal will be washed away by the moving water which can flow from the trough 30 to the inside of the pipe for eventual disposal. If desired, the trough 30 can be eliminated and the very bottom of the tube can act as the trough to carry water. In each instance, the water cools and solidifies the molten metal droplets in the hot stream before they contact and adhere to the metal workpieces.

Figure 5:
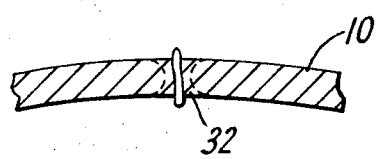
FIG. 5 is a view in section of a typical weld seam.

FIG. 5 illustrates, in section, a typical weld seam obtained when using the structure of this invention. In this invention, the high frequency heating means is the main source of heat, and the stream of hot molten metal droplets supplies additional molten metal. The result is a pinched center heat affected area 32. The absence of the large upset is to be noted as less forge pressure is required to make the weld.

FIG. 6 is a view of a weld seam in section illustrating the flow lines of metal brought to final heat with high frequency resistance heating means or high frequency induction heating means only. It should be noted how the flow lines bend outward. Removal of the upset results in the cutting of the flow lines.

Referring to FIG. 7, there is illustrated a view in section of a weld seam brought to a desired temperature by high frequency resistance heating means or high frequency induction heating means and to a final melt state by a stream of hot molten metal droplets from a metallizing type of gun means. It is to be noted that the flow lines are positioned end to end and are not reoriented at right angles to their normal positions as shown in FIG. 6.

The removal of the excess metal 34 from the top and bottom surfaces of the weld does not result in the cutting of any of the flow lines.

In operation, in this invention, the main source of welding power that raises the temperature of the workpieces to a desired temperature can be a high frequency resistance heating means, high frequency induction heating means where the coil is positioned around the workpiece such as a tube or the like, or a high frequency induction heating means where the induction coil is operated in the 3,000 to 10,000 cycles per second range, the coil being positioned over the tube rather than around it.

The metallizing type of gun means can be positioned to direct the stream of hot molten metal droplets either straight down onto the two workpieces or at a desired angle to the workpieces. The stream of hot molten metal droplets should be positioned to impinge upon the metal workpieces completely across the workpiece faces that are to be welded.

The high frequency heating means contributes the heat required to forge weld the two edges together. However, by itself, the high frequency heating means does not produce a temperature at the apex of the V that is as uniform as desired and, without the additional melt that is supplied by the stream of hot molten metal droplets, heavy forging action would be required to make a weld. The stream of hot molten metal droplets in combination with the high frequency heating means provides more uniform temperature distribution across the faces that are to be welded at the apex of the V, and much less forging pressure is required to make the weld. The additional metal obtained from the stream of hot molten metal droplets forms an additional amount of melt on the faces that are to be welded.

Immediately downstream from the apex of the V, squeeze rolls force the two edges together to form a forge weld, the molten metal together with contained inclusions being squeezed out. In this invention, as there is additional melted metal present, in addition to a more uniform distribution of interface temperature, much less pressure is required to make the forge weld than would be required if high frequency heating without the stream of hot molten metal droplets were used.

Thus, the rate of welding relatively thick materials is high when using high frequency heating means in combination with a stream of hot molten metal droplets as the high frequency heating means supplies the heat required and the stream of hot molten metal droplets provides the additional melt to the faces at the apex of the V.

Depending upon the application for which the welded workpiece is to be used, the metal or the composition of the metal in the stream of hot molten metal droplets can be similar to or different from the metal or the composition of the metal of the workpieces. In those instances where dissimilar metals are being welded together, the metal or the composition of the metal in the stream of hot molten metal droplets can be similar to one or not similar to either of the workpieces. In either event, the metal in the stream of hot molten metal should be such that it wets each of the surfaces of the workpieces that are being joined together by welding.

Obviously many modifications and variations of the present invention are possible in the light of the above teachings. It is, therefore, to be understood that within the scope of the appended claims the invention may be practiced otherwise than as specifically described herein.

I claim:

1. Method for welding a seam extending along opposed edges of two elongated metal portions, which comprises: rapidly advancing said portions with their said edges passing along the line of the desired seam and past a weld point; firmly retaining said edges together as they reach the region of said weld point; maintaining on said edges over a distance substantially in advance of said weld point, flows of electrical current of a frequency of the order of 10,000 cycles per second or higher for progressively heating such edges up to welding temperature upon reaching said point; and directing a stream of hot molten metal droplets upon the edges at or immediately upstream of the weld point to add hot metal to said edges.

2. Apparatus for welding together metal workpieces positioned prior to welding to form a V-shaped gap therebetween, the apex of the V being the weld point where the workpieces are joined to form a weld seam, comprising first heating means for heating the workpieces so that they are at a desired temperature at said weld point, a source of molten metal positioned at a location out of said V-shaped gap for directing a stream of molten metal droplets onto the workpieces at or slightly in advance of the weld point, thereby to add molten metal to said weld point, and means for forming said V-shaped gap between the workpieces.

3. The structure of claim 2 wherein the molten metal droplets of said stream of hot molten metal droplets has a composition similar to at least one of the edge surfaces of said workpieces.

4. The structure of claim 2 wherein the molten metal droplets of said stream of hot molten metal droplets has a composition dissimilar to the edge surfaces of said workpieces.

5. The apparatus of claim 2 wherein the source of molten metal is a metallizing gun which produces said stream of molten metal droplets.

6. The apparatus claimed in claim 5 wherein said first heating means heats the workpieces to forge welding temperature at said weld point, the apparatus further including means for applying pressure to said workpieces to produce a forge weld at the weld point but said pressure being insufficient to bend outwardly into the weld seam any lines of segregation present in the workpieces at the weld point.

7. Apparatus for welding together two edges to form a weld seam, comprising means for advancing said edges in spaced apart relationship and for bringing the edges together at a desired weld point thereby to form a V-shaped configuration of said edges in advance of said weld point, means for applying a high frequency heating current which flows in a path along one edge to said weld point and then along the other edge to heat said edge substantially to welding temperature, means disposed outside of said V-shaped configuration and away from said current path for directing a stream of molten metal droplets onto said edges at or immediately in advance of said weld point, means for applying welding pressure to said edges substantially at said weld point to form said weld seam.

8. The apparatus claimed in claim 7 wherein the means for applying welding pressure applies pressure sufficient to form a forge weld but insufficient pressure to bend outwardly into the weld seam any lines of segregation present at said edges as they reach the weld point.

9. Method for welding together the edges of a longitudinal gap in metal tubing which comprises longitudinally advancing the tubing while subjecting the same to pressure from opposite sides thereof to bring the gap edges together at a welding point as a narrow V-shaped formation, and while heating said edges to forge welding temperature by applying high frequency current thereto, directing from a position transverse to said tubing a stream of hot molten metal droplets upon the gap edges at or immediately upstream of the weld point for adding hot molten to the edges at the weld point.